United States Patent [19]

Kressdorf et al.

[11] Patent Number: 5,274,067

[45] Date of Patent: Dec. 28, 1993

[54] BINDERS CONTAINING ETHYLENICALLY UNSATURATED GROUPS AND THEIR USE FOR THE PRODUCTION OF PAINTS

[75] Inventors: Burkhard Kressdorf, Walsrode; Erhard Luhmann, Bomlitz; Lutz Hoppe, Walsrode; Wolfgang Koch, Bomlitz; Klaus Szablikowski, Walsrode, all of Fed. Rep. of Germany

[73] Assignee: Wolff Walsrode AG, Walsrode, Fed. Rep. of Germany

[21] Appl. No.: 677,199

[22] Filed: Mar. 29, 1991

[30] Foreign Application Priority Data

Apr. 7, 1990 [DE] Fed. Rep. of Germany ....... 4011349

[51] Int. Cl.$^5$ .................... C08G 18/12; C08G 18/30; C09D 175/04
[52] U.S. Cl. ...................... 528/75; 524/591; 525/440; 525/447; 528/80; 528/83
[58] Field of Search ............... 528/75, 80, 83; 525/440, 447; 524/591

[56] References Cited

U.S. PATENT DOCUMENTS

| | | | |
|---|---|---|---|
| 3,703,498 | 11/1972 | Harris | 528/75 |
| 3,898,349 | 8/1975 | Kehr et al. | 523/176 |
| 4,837,271 | 6/1989 | Brindöpke | 528/75 |
| 4,898,620 | 2/1990 | Rayfield et al. | 524/425 |

FOREIGN PATENT DOCUMENTS

| | | |
|---|---|---|
| 0002129 | 5/1979 | European Pat. Off. |
| 0315920 | 5/1989 | European Pat. Off. |
| 0356848 | 3/1990 | European Pat. Off. |

OTHER PUBLICATIONS 8623J and 88117-56-0: "Room-temperature-curable polyester coating materials", Datenbasis Chem. Abstracts, V. 100 N. 2 (Jan. 1984) (1983).

Primary Examiner—John Kight, III
Assistant Examiner—John M. Cooney, Jr.
Attorney, Agent, or Firm—Sprung Horn Kramer & Woods

[57] ABSTRACT

Unsaturated polyester polyurethanes based on an allyl-ether-modified polyester A and a polyisocyanate B are suitable for paints having improved hardness and appearance.

9 Claims, No Drawings

BINDERS CONTAINING ETHYLENICALLY UNSATURATED GROUPS AND THEIR USE FOR THE PRODUCTION OF PAINTS

This invention relates to new water-dilutable allyl urethanes, to a process for their production and to their use as a paint resin.

It is known that elastic, abrasion-resistant coatings can be obtained using paint resins containing urethane groups. The urethane groups can cause significant interactions within the polymer chains which is beneficial to their use as coatings resistant to water and chemicals. Another feature worth emphasizing is the very good adhesion of polyurethanes to various substrates which is attributable to significant polar interaction with those substrates.

Urethane resins containing ethylenically unsaturated groups which are both air-drying and can be cured with peroxides and by high-energy radiation are particularly advantageous. Polyurethane products of this type are used, for example, in the form of radiation-curable urethane acrylates (U.S. Pat. No. 4,451,509, EP-A-53 749). Paints such as these have to be diluted with reactive diluents based on acrylic acid. In the same way as urethane acrylates, however, these reactive diluents have physiological disadvantages. Thus, they can cause irritation and increased sensitization of the skin.

On the other hand, processing viscosities can also be established by the use of inert organic solvents. However, inert organic solvents cause air pollution during drying and necessitate the use of elaborate disposal systems (cf. CA-PS 1,192,331).

Allyl-ether-functional unsaturated polyester urethanes are described in EP-A-0 315 920. These urethanes can only be used in organic solvents and with addition of reactive diluents. A polyester is first prepared and then reacted with a diisocyanate, one isocyanate group of the diisocyanate reacting with one OH group of the polyester. It is in the nature of the reaction that the diisocyanate molecules remain partly unreacted in the mixture while two polyester molecules are attached to one another by a diisocyanate. In the following, third reaction step, an alcohol containing allyl groups is reacted with the isocyanate groups. At the same time, any diisocyanates still present in the reaction mixture react inter alia with two alcohols containing allyl ether groups to form a low molecular weight compound which adversely affects the paint properties. On account of the polyesters used, these products can only be emulsified in water using disproportionately large quantities of emulsifier.

Environmentally the most friendly and physiologically the safest diluent for establishing the processing viscosity of paint binders is water. The production of polyurethane dispersions, including those containing ethylenically unsaturated groups, is known. Four main production processes and the basic components required are described in Ullmann's Enzyklopädie der Technischen Chemie, 4th Edition, Vol. 19, Weinheim, 1980. The processes in question are the emulsifier/shear force process, the prepolymer/ionomer process, the acetone process and the melt dispersion process. In the first three processes, the polyaddition reactions are generally carried out in solvents.

Where the polyurethanes are subsequently used in aqueous systems, for example as aqueous dispersions, this means that elaborate measures have to be taken to convert the solution of the polyurethane in the organic solvent into an aqueous form or to disperse and stabilize it in an aqueous medium and then to remove the organic solvent from the aqueous system.

In the emulsifier/shear force process, any polyurethane can be converted into an emulsion or dispersion of the oil-in-water type with the assistance of suitable emulsifiers and powerful shear forces. In general, isocyanate prepolymers are dispersed in water and subsequently reacted by amine chain extension in a heterogeneous two-phase reaction. The end product is a polyurethane urea. The final dispersion generally still contains residual solvent. However, this process is energy-intensive and the addition of an emulsifier adversely affects the quality of the paint.

Emulsifier-free ionomer dispersions have acquired the greatest industrial importance. In their case, a polyurethan ionomer containing free isocyanate groups is prepared in a solvent, dispersed with the solvent and generally chain-extended. The solvent then has to be distilled off. Residues of solvent remain in the dispersion. The high proportion of ionic groups leaves the cured paints with poor resistance to water.

The emulsification of a prepolymer in water and subsequent chain extension in a heterogeneous two-phase reaction is state-of-the-art, even for the melt dispersion process (cf. Ullmann: Encyklopädie der Technischen Chemie, see above). Highly ionic polymers are also produced in the melt dispersion process and have to be after-reacted in the dispersion.

DE-A-2 923 338 describes the ripening of an aqueous polyester dispersion which is characterized in that the dispersion additionally contains at least one polyfunctional, aliphatic and/or cycloaliphatic isocyanate in a quantity of 0.005 to 0.1 mol NCO per 100 g polyester. Isocyanate-containing products are physiologically very unsafe because they can cause serious irritation of the skin, eyes and mucous membrane and can lead to long-term damage. In addition, the handling of isocyanate-containing paint binders requires elaborate safety precautions. The non-specific reaction of the isocyanate on the one hand with the paint resins and, on the other hand, with the water leads to the introduction of hydrophilic groups which impair resistance to water. In addition, the reaction is accompanied by a vigorous evolution of gas. Storage life is correspondingly impaired (see Example).

DE-A-3 829 588 describes allyl urethanes prepared by reaction of a polyglycol mixture or the esterification product thereof with a polyisocyanate and a hydroxyallyl compound. Low molecular weight reaction products of diisocyanate and hydroxyallyl compound can be formed during this reaction. High molecular weight polyglycols, such as polyethylene glycol 2000, are used in this product. This is known to reduce the resistance of the paint to water, in addition to which the paint surface becomes rubber-like.

DE-A-3 829 590 describes allyl urethanes which are not dispersible in water, but have to be applied in an organic solvent. This necessitates the use of expensive waste-air burning plants.

The problem addressed by the present invention was to provide a water-dispersible or water-soluble, polymerizable binder based on unsaturated polyesters containing urethane groups which would be curable by high-energy radiation and even by peroxides would not have any of the disadvantages mentioned above and, after curing, would show favorable paint properties, more particularly improved hardness and adhesion, reduced penetration into wood, and would not contain any free isocyanate groups or solvent residues.

The present invention relates to unsaturated polyester polyurethanes P based on at least one polyester A containing an allyl ether group and at least one polyisocyanate B, characterized in that, in the polyester A, the allyl ether group is attached to the rest of the polyester by an ester group and in that the polyester A is synthesized from C at least one $\alpha,\beta$-ethylenically unsaturated carboxylic acid or anhydride thereof,
D at least one allyl ether containing hydroxyl groups,
E at least one polyalkylene glycol,
F optionally at least one monohydric alcohol and
G optionally at least one at least trihydric aliphatic polyol free from double bonds, preferably an alkoxylated polyol.

In one preferred embodiment, A corresponds to the following general formula

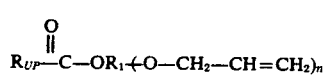   1)

in which $R_{UP}$ is the residue of an unsaturated polyester polyol after removal of a carboxyl group,
$R_1$ is the residue of a polyol after removal of at least two OH groups, more particularly a trimethylol propane residue after removal of two OH groups,
n is an integer of 1 to 4, the polyester A having an OH value of at least 30 and, more particularly, at least 40.

The present invention also relates to a process for the production of the unsaturated polyester polyurethanes P by reaction of A an allyl-ether-modified polyester A with
B a polyisocyanate B by polyaddition in the absence of water and solvents at temperatures of 50° C. to 120° C. and more particularly at temperatures of 60° C. to 80° C.

The present invention also relates to the use of the polymers according to the invention as a paint resin.

It has now surprisingly been found that binders having the above-mentioned properties can be produced by the reaction of unsaturated allyl-ether-functional polyesters with polyisocyanates. The unsaturated polyester polyurethanes according to the invention are characterized by the fact that the allyl-ether-functional group is attached to the rest of the polyester by an ester bond and not by a urethane group.

In contrast to heterogeneous two-phase reactions with chain extension, predominantly nonionic polymers are produced in the process according to the invention and can be converted into aqueous dispersions without emulsifiers by mixing in liquid form with minimal application of shear forces. This provides for the ballast-free transport of even 100% products.

The present invention preferably relates to allyl-ether-functional unsaturated polyester urethanes based on 80 to 99 parts by weight, preferably 88 to 98 parts by weight and, more preferably 88 to 96 parts by weight of a water-dispersible or water-soluble, allyl-ether-functional unsaturated polyester A and 1 to 20 parts by weight, preferably 2 to 12 parts by weight and more preferably 2 to 10 parts by weight of a polyisocyanate B.

The production of allyl-ether-functional unsaturated polyesters which can be dispersed in water without emulsifiers is known from DE-OS 3 441 154 (=EP-A-182 147), DE-OS 2 905 666, DE-OS 2 804 216, DE-OS 3 218 200.

By virtue of their content of polyalkylene glycols, these polyesters can be dispersed in water, as also mentioned in the above-cited patents.

Other preferred polyesters are water-soluble polyesters which are free from polymerizable (meth)acrylic acid units and contain $\alpha,\beta$-unsaturated and $\beta,\gamma$-unsaturated double bonds, characterized in that the binders are obtainable by condensation of the following compounds:

at least one polyalkylene glycol having an average molecular weight of 300 to 1,000,
at least one alkoxylated triol,
optionally at least one alkoxylated tetrahydric to hexahydric polyol, at least one $\alpha,\beta$-unsaturated polycarboxylic acid or an anhydride thereof and at least one allyl-ether-functional alcohol.

The polyesters A are preferably co-condensates of polycarboxylic acids, preferably $\alpha,\beta$-ethylenically unsaturated dicarboxylic acids, one or more allyl ethers containing hydroxyl groups and one or more monohydric or polyhydric alcohols, including at least one polyalkylene glycol.

Preferred polyesters contain the following co-condensed components:

one or more polycarboxylic acids C or anhydrides thereof, more particularly an $\alpha,\beta$-ethylenically unsaturated carboxylic acid,
an alcohol D containing allyl ether, more particularly trimethylol propane diallyl ether,
one or more dihydric alcohols E, including at least one polyalkylene glycol, more particularly a polyethylene glycol,
optionally one or more monohydric, saturated, aliphatic, cycloaliphatic or aromatic alcohols F preferably containing 4 to 12 carbon atoms and/or
optionally one or more at least trihydric alkoxylated polyols G.

The polycarboxylic acids C or anhydrides are preferably saturated dicarboxylic acids, anhydrides of dicarboxylic acids being particularly preferred. Suitable dicarboxylic acids or anhydrides for the production of the polyesters according to the invention are, for example, maleic acid, chloromaleic acid, fumaric acid, citraconic acid, itaconic acid, mesaconic acid or, where they can be produced, the anhydrides of the dicarboxylic acids mentioned. Maleic anhydride and fumaric acid are preferred, maleic anhydride being particularly preferred.

Flame-retardant resins can be produced, for example, with hexachloroendomethylene tetrahydrophthalic acid, tetrachlorophthalic acid or tetrabromophthalic acid.

In addition to at least one esterifiable hydroxy group, the allyl-ether-functional alcohols D contain at least one and preferably two or more allyl ether groups.

Suitable alcohols D are, for example, allyl, methallyl, ethallyl and chloroallyl ethers, such as ethoxylated or propoxylated allyl, methallyl, ethallyl or chloroallyl alcohol, glycerol mono- or diallyl ether, trimethylol ethane mono- or dimethallyl ether, trimethylol propane mono- or diallyl ether, 1,3,5-hexanetriol mono- or dichloroallyl ether, pentaerythritol mono-, di- or triallyl ether, tetramethylol cyclohexanol tetraallyl ether, but-2,3-ene-1,4-diol monoallyl ether, mixed ethers, such as trimethylol propane monoallyl/monocrotyl ether and pentaerythritol mono- or diallyl/monobenzyl ether. Trimethylol propane mono- and diallyl ethers are particularly preferred.

Suitable dihydric alcohols E are ethylene glycol, propane-1,2-diol, propane-1,3-diol, diethylene glycol, dipropylene glycol, butane-1,3-diol, butane-1,4-diol, neopentyl glycol, hexane-1,6-diol, bis-alkoxylated bisphenol A, perhydrobisphenol A, 1,4-cyclohexane dimethanol, 2,2-dichloromethyl propane-1,3-diol, 2,2,4-trimethylpentane-1,3-diol, poly-(tetrahydrofuran) diol, 1,4-bis-(hydroxymethyl) cyclohexane, tricyclodecane dimethanol, and polyalkylene glycols, such as polyethylene glycols and polypropylene glycols. Polyethylene glycols are preferred.

Preferred more than dihydric polyols G are trihydric to hexahydric alkoxylated alcohols. Alkoxylated alcohols are understood to be ethoxylated and/or propoxylated trihydric to hexahydric aliphatic alcohols. Particularly preferred alkoxylated polyols contain 3 to 20 mol ethylene or propylene oxide per mol polyol. The polyols are based on trihydric to hexahydric aliphatic alcohols, for example glycerol, trimethylol propane, trimethylol ethers, pentaerythritol, erythritol sorbitol, di-trimethylol propane and dipentaerythritol.

In one particularly preferred embodiment, components A to F are used in the following quantities:

| | |
|---|---|
| polycarboxylic acid C: | 15 to 45 parts by weight, |
| preferably | 20 to 35 parts by weight |
| allyl-ether-functional alcohol B: | 15 to 45 parts by weight, |
| preferably | 20 to 40 parts by weight |
| alcohol E: | 10 to 40 parts by weight, |
| preferably | 15 to 35 parts by weight |
| monohydric alcohols F: | 0 to 15 parts by weight |
| polyols G: | 0 to 40 parts by weight. |

The molecular weight can be reduced and the properties, more particularly the dispersion or solubility properties, can be modified by the use of monohydric alcohols F, such as methanol, ethanol, butanol, pentanol, heptanol, isooctanol, allyl alcohol, benzyl alcohol, all hexanols, octanols and decanols, cetyl alcohols, hexahydrobenzyl alcohol, $\beta$-phenyl ethanol and polyalkylene glycol alkyl ether.

The polyesters can be produced by known methods, for example by melt or azeotropic esterification of the alcohols and acids or esterifiable derivatives thereof, for example anhydrides (cf. Methoden der Organischen Chemie, Houben-Weyl, 4th Edition, Vol. 14/2, Georg-Thieme-Verlag, Stuttgart, 1961). The polyesters are preferably produced by melt condensation in an inert gas atmosphere at temperatures of 140° to 200° C. and preferably at temperatures of 150° to 180° C.

To protect the polyesters against unwanted premature crosslinking, polymerization inhibitors or antioxidants may be added during the production of the polyesters. Suitable stabilizers are described in "Methoden der Organischen Chemie", Houben/Weyl, 4th Edition, Vol. 14/1, page 433, Georg-Thieme-Verlag, Stuttgart, 1961.

The stabilizers in question are the usual compounds used for preventing thermal polymerization, for example phenols and phenol derivatives; preferably sterically hindered phenols, such as 2,6-di-tert.-butyl phenol, amines, nitrosamines, quinones, hydroquinone monoalkyl ethers, phenothiazines or phosphorous acid esters. They are generally used in quantities of 0.001 to 3.0% by weight and preferably in quantities of 0.005 to 0.5% by weight. Toluhydroquinone, for example, in a concentration of 0.01 to 0.05% by weight is particularly suitable.

Where the binder according to the invention is cured with the aromatic ketone photoinitiators often used in the field in question, there is surprisingly no need whatever to use amines as activator without any loss of speed.

To obtain the unsaturated polyester polyurethane P, the allyl-ether-functional unsaturated polyesters A are subsequently reacted with a polyisocyanate B in an inert gas atmosphere at temperatures of generally 50° to 120° C. and preferably at temperatures of 60° to 80° C. Aliphatic, cycloaliphatic, araliphatic or aromatic polyisocyanates may be used, aliphatic and cycloaliphatic polyisocyanates being preferred. Mixtures of these polyisocyanates are also suitable. Examples of suitable polyisocyanates are ethylene diisocyanate, trimethylene diisocyanate, tetramethylene diisocyanate, pentamethylene diisocyanate, hexamethylene diisocyanate, 2-methyl pentamethylene diisocyanate, dodecamethylene diisocyanate, ethyl ethylene diisocyanate, 2,3-dimethyl ethylene diisocyanate, 1-methyl trimethylene diisocyanate, 1,3-cyclopentylene diisocyanate, 1,4-cyclohexylene diisocyanate, 1,3-cyclohexylene diisocyanate, 1,3-phenylene diisocyanate, 1,4-phenylene diisocyanate, 2,4-tolylene diisocyanate, 2,6-tolylene diisocyanate, 1,5-naphthylene diisocyanate, 1,4-naphthylene diisocyanate, 4,4'-diisocyanatodiphenyl ether, 2,3-bis-(8-isocyanatooctyl)-4-octyl-5-hexyl cyclohexene, isophorone diisocyanate, diphenyl methane-2,4'- and/or -4,4'-diisocyanate, cyclobutane-1,3-diisocyanate, 2,6-hexahydrotolylene diisocyanate, 2,4-hexahydrotolylene diisocyanate, hexahydro-1,3-and/or -1,4-phenylene diisocyanate, triphenyl methane-4,4',4''-triisocyanate, trimethyl hexane diisocyanate, dicyclohexyl methane-4,4'-(and/or -2,4'- and/or -2,2')diisocyanate and monomethyl- and dimethyl-substituted derivatives thereof and also triisocyanates and polyisocyanates formed by trimerization or oligomerization of diisocyanates or by reaction of diisocyanates with polyfunctional compounds containing OH or NH groups. Compounds such as these include, for example, the biuret of hexamethylene diisocyanate and water, the isocyanurate of hexamethylene diisocyanate and the adduct of isophorone diisocyanate with trimethylol propane. Hexamethylene diisocyanate is particularly preferred.

The reaction is carried out until the isocyanate groups have been completely reacted. Known catalysts which accelerate the isocyanate addition reaction may also be added. Suitable catalysts are, for example, tertiary amines, such as triethylamine, triethylenediamine or diethylene benzylamine, or known tin catalysts, for example tin dioctoate or dibutyl tin dilaurate. This step does not take place in aqueous phase and is preferably carried out in the absence of solvents. In addition, inhibitors of the type described above may be added to the reaction mixture to prevent premature polymerization of the allyl groups.

A polyester polyurethane suitable as a paint binder is obtained and can be diluted with water in the absence of auxiliaries, for example emulsifiers.

Depending on the type of polyester urethane and the degree of dilution, dilution with water in the absence of emulsifiers can lead to a clear homogeneous solution (soluble in water) or a dispersion having a maximum particle size of 10 μm and preferably 5 μm. Dilution with water may be carried out using any dispersion units having sufficiently high peripheral speeds of 1 to 50 m/s and preferably 3 to 30 m/s.

Excess carboxyl groups do not have to be neutralized with amines to achieve the dilutability with water. In their cured state, the lacquer binders have the advantages of urethane acrylates and two-component polyurethane lacquers, including for example good flow, scratch resistance, adhesion and hardness, without any of their disadvantages, such as physiologically unsafe isocyanates and acrylates. The reduced penetration into wood substrates in relation to urethane acrylates is also worth emphasizing.

The paint binders according to the invention may contain the components required to obtain special technical effects, such as fillers, pigments, dyes, thixotropic agents, smoothing agents, flatting agents, flow control agents, etc., in the usual quantities. The paint properties may be varied according to requirements by addition of reactive diluents or other high molecular weight paint binders. They may be combined with other typical constituents of paints, such as for example nitrocellulose, polyacrylate resins, alkyd resins, unsaturated polyesters and other radiation-curing components.

The paint binders can not only be dissolved in water, they may also be dissolved where required in organic solvents and in reactive diluents.

Suitable methods of application include spray coating, roll coating, knife coating, casting, spread coating and dip coating.

The binder according to the invention may be polymerized after evaporation of the water, paint films having favorable surface properties being obtained, preferably on wood, but also on plastics and metals. The polymerization may be carried out thermally and/or with addition of polymerization initiators (for example radical formers), and also by high-energy radiation (UV radiation, electron beams, X rays or gamma rays, in which case photoinitiators may be added). UV curing is particularly preferred.

Suitable photoinitiators are the known compounds for radiation curing, including for example aromatic ketone compounds, benzophenones, alkyl benzophenones, halomethylated benzophenones, Michler's ketone, anthrone and halogenated benzophenones. Other suitable photoinitiators are 2,4,6-trimethyl benzoyl diphenyl phosphine oxide, phenyl glyoxylic acid ester, anthraquinone and its many derivatives, particularly benzoin and its derivatives, also benzilketals and hydroxyalkylphenones. Examples of suitable initiators can be found in DE-OSS 1 769 168, 1 769 853, 1 769 854, 1 807 297, 1 807 301, 1 919 678 and in DE-AS 1 694 143. Mixtures of these compounds may also be used.

Curing may also be carried out with polymerization-initiating radical formers. Water-soluble peroxides, such as hydrogen peroxide and acetyl acetone peroxide, also methyl ethyl ketone hydroperoxide, cyclohexanone peroxide, or aqueous emulsions of water-insoluble initiators are preferably used.

These radical formers may be combined in known manner with accelerators, such as for example heavy metal salts of carboxylic acids, chelates of these metals, such as the acetates, naphthenates or acetyl acetonates of these metals. Providing they are soluble in water, the accelerators may also be added in the form of aqueous solutions, otherwise they are added in the form of aqueous emulsions.

EXAMPLES

Production of the Polyesters

Polyester A 1 based on
38.3% by weight trimethylol propane diallyl ether
29.2% by weight maleic anhydride
12.9% by weight benzyl alcohol
12.5% by weight polyethylene glycol 1550
12.5% by weight propylene glycol
was produced by melt condensation under nitrogen by the method known from DE-A-3 441 154. It had an acid value of 18 to 20 mg KOH/g and a hydroxyl value of 49 mg KOH/g.

The other allyl-ether-functional polyesters were produced in the same way.

Polyester A 2

27.6% by weight polyethylene glycol 400,
27.6% by weight triethoxylated glycerol,
24.7% by weight maleic anhydride,
20.1% by weight trimethylol propane diallyl ether.
Acid value 20 mg KOH/g polymer, hydroxyl value 51 mg KOH/g.

Polyester A 3

24.6% by weight polyethylene glycol 400,
23.0% by weight triethoxylated glycerol,
23.4% by weight maleic anhydride,
29.0% by weight trimethylol propane diallyl ether.
Acid value 22 mg KOH/g polymer, hydroxyl value 50 mg KOH/g.

Polyester A 4

16.2% by weight polyethylene glycol 400,
29.0% by weight triethoxylated glycerol,
24.5% by weight maleic anhydride,
30.3% by weight trimethylol propane diallyl ether.
Acid value 25 mg KOH/g polymer, hydroxyl value 51 mg KOH/g.

Polyester A 5

23.2% by weight polyethylene glycol 600,
30.9% by weight triethoxylated glycerol,
23.5% by weight maleic anhydride,
22.5% by weight trimethylol propane diallyl ether.
Acid value 24 mg KOH/g polymer, hydroxyl value 55 mg KOH/g.

Polyester A 6

22.6% by weight polyethylene glycol 400,
2.0% by weight pentaethoxylated pentaerythritol,
27.4% by weight triethoxylated glycerol,
24.5% by weight maleic anhydride,
23.5% by weight trimethylol propane diallyl ether.
Acid value 25 mg KOH/g polymer, hydroxyl value 50 mg KOH/g.

EXAMPLES 1 TO 7

Polyester A 1 was reacted with various polyisocyanates in various concentrations, as shown in Table 1 below, with stirring under nitrogen at 65° to 70° C. until no more isocyanate could be detected.

Production of the Dispersions and Solutions

To produce the dispersion, the same quantity of water was added to the binder according to the invention in a dissolver at an initial temperature of 60° C. so that the solids content could be adjusted to 50%.

In Example 8, the binder produced in accordance with Example 2 was not dispersed with water, but instead was dissolved in butyl acetate to form an 80% solution and then tested under the same conditions as the dispersion.

Testing of the Paint Binder

After addition of 3% by weight of the mixture of the photoinitiators 2-hydroxy-2-methyl-1-vinylpropan-1-one and benzophenone in a ratio of 2:1 to the dispersion, the samples were knife-coated onto a glass plate in a layer thickness of 90 μm, dried and irradiated with UV light (80 W/cm). Transparent scratch-resistant films are obtained. The König pendulum hardness (DIN 53 157) was determined. The paint films are water-resistant in accordance with DIN 53 168.

A sheet of wood was coated in the same way in a layer thickness of 120 μm, dried and irradiated with UV light. In this case, both flow and penetration of the paint into the substrate were evaluated.

COMPARISON EXAMPLE 1

In this Comparison Example, polyester A 1 is not further crosslinked with a diisocyanate. Pendulum hardness is distinctly lower and the lacquer penetrates to a considerable extent into the substrate.

COMPARISON EXAMPLE 2

Before dispersion, 4.5% hexamethylene diisocyanate was added to polyester A 1 in accordance with DE-A-2 923 338, followed immediately by dispersion. The dispersion formed was still foaming vigorously after 1 day and, accordingly, could not be used. The paint binder could only be tested after 3 days. Pendulum hardness, at 60 seconds, is not much higher than that of the starting polyester and is very much lower than that of the binders according to the invention. In contrast to the binders according to the invention, the lacquer penetrates to a considerable extent into the substrate. The pot life was only 7 days whereas the dispersions and solutions of the products according to the invention remain stable for more than 3 months.

EXAMPLES 8 TO 13

Polyesters A 2–A 6 were reacted with hexamethylene diisocyanate as in Examples 1 to 7. Clear 80% solutions were prepared by addition of water and were tested under the same conditions as the dispersions. In every case, extremely hard, scratch-resistant coatings were obtained and did not show the penetration into the substrate described in Comparison Examples 1 and 2.

TABLE 1

| Example | | 1 | 2 | 3 | 4 | 5 | 6 | 7 | Comparison Example |
|---|---|---|---|---|---|---|---|---|---|
| Polyester A 1 | (% by weight) | 96.2 | 95.2 | 94.2 | 96.2 | 96.2 | 93.4 | 96.2 | 100 |
| HDI | (% by weight) | 3.8 | 4.8 | 5.8 | — | — | — | 3.8 | — |
| IPDI | (% by weight) | — | — | — | 3.8 | — | — | — | — |
| 2,4-TDI | (% by weight) | — | — | — | — | 3.8 | — | — | — |
| Demodur N 3200 | (% by weight) | — | — | — | — | — | 5.6 | — | — |
| Solvent | (% by weight) | Water | Water | Water | Water | Water | Water | Butyl acetate | Water |
| OH:NCO ratio | (mol/mol) | 1.9/1 | 1.5/1 | 1.2/1 | 2.5/1 | 1.9/1 | 2.7/1 | 1.9/1 | — |
| Pendulum hardness | (s) | 84 | 94 | 84 | 81 | 71 | 71 | 55 | 58 |
| Flow | | Good | Good | Good | Good | Good | Good | Good | Penetrates seriously into into the substrate |
| Paint surface | | Scratch resistant | Scratch resistant | Scratch resistant | Scratch resistant | Scratch resistant | Scratch resistant | Scratch resistant | Scratch resistant |

HDI = Hexamethylene diisocyanate
IPDI = isophorone diisocyanate
2,4-TDI = 2,4-tolylene diisocyanate
Desmodur N 3200 = HDI biuret, a product of Bayer AG

TABLE 2

| Examples | 8 | 9 | 10 | 11 | 12 | 13 |
|---|---|---|---|---|---|---|
| Polyester used | A2 | A3 | A3 | A4 | A5 | A6 |
| Quantity of polyester (% by weight) | 98.0 | 98.0 | 95.5 | 99 | 98.0 | 99 |
| HDI (% by weight) | 2.0 | 2.0 | 4.5 | 1.0 | 2.0 | 1 |
| Pendulum hardness (s) | 88 | 77 | 93 | 73 | 79 | 80 |
| OH/NCO ratio (mol/mol) | 7.6/1 | 7.5/1 | 3.2/1 | 15/1 | 8.3/1 | 15/1 |
| Paint surface | Scratch resistant | Scratch resistant | Scratch resistant | Scratch resistant | Scratch resistant | Scratch resistant |
| Flow | Good | Good | Good | Good | Good | Good |

We claim:

1. Unsaturated polyester polyurethanes P based on a polyester A containing an allyl ether group and a polyisocyanate B, characterized in that, in the polyester A, the allyl ether group is attached to the rest of the polyester by an ester group and in that the polyester A is synthesized from C at least one α,β-ethylenically unsaturated aliphatic carboxylic acid or anhydride thereof,
D at least one allyl ether containing hydroxyl groups,
E at least one polyalkylene glycol,
F optionally at least one monohydric alcohol and
G optionally at least one trihydric aliphatic polyol free from double bonds and then reacted with the polyisocyanate B.

2. Unsaturated polyester polyurethanes P as claimed in claim 1, characterized in that the polyester A corresponds to the following formula

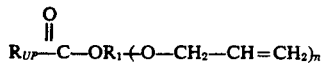

1)

in which $R_{UP}$ is the residue of an unsaturated polyester polyol after removal of a carboxyl group, $R_1$ is the residue of a polyol after removal of at least two OH groups, n is an integer of 1 to 4.

3. Unsaturated polyester polyurethanes as claimed in claim 1, characterized in that the polyester A is a condensation product of at least one polycarboxylic acid or anhydride thereof, a hydroxyl-containing allyl ether and a polyol.

4. Unsaturated polyester polyurethanes as claimed in claim 1, characterized in that the polyester A is synthesized from at least one member of each of the following groups:

C an $\alpha,\beta$-ethylenically unsaturated aliphatic carboxylic acid or anhydride thereof, D trimethylol propane diallyl ether, E a polyalkylene glycol and F optionally a monohydric alcohol and/or G optionally a more than dihydric polyol.

5. Polyester polyurethanes as claimed in claim 1, characterized in that the isocyanate B is hexamethylene diisocyanate, isophorone diisocyanate or tolylene diisocyanate.

6. A process for the production of the unsaturated polyester polyurethane P claimed in claim 1 by reaction of an allyl-ethyl-modified polyester A with a polyisocyanate, characterized in that, in polyester A, the allyl group is attached to the rest of the polyester by an ester group and the reaction is carried out at a temperature of 50° to 120° C.

7. A paint based on an unsaturated polyester polyurethane and, optionally, standard additives, paint auxiliaries and dispersants, characterized in that it contains the unsaturated polyester polyurethane P claimed in claim 1.

8. The paint claimed in claim 7, characterized in that it is dispersible or soluble in water.

9. An unsaturated polyester polyurethane P in accordance with claim 1, wherein said at least one trihydric aliphatic polyol free from double bonds is an alkoxylated polyol.

* * * * *